(12) United States Patent
Kojima et al.

(10) Patent No.: US 8,197,729 B2
(45) Date of Patent: Jun. 12, 2012

(54) METHOD OF GRANULATION WITH A FLUIDIZED BED GRANULATOR

(75) Inventors: Yasuhiko Kojima, Narashino (JP); Takahiro Yanagawa, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 411 days.

(21) Appl. No.: 12/290,416

(22) Filed: Oct. 30, 2008

(65) Prior Publication Data

US 2009/0134536 A1 May 28, 2009

(30) Foreign Application Priority Data

Oct. 30, 2007 (JP) ................................. 2007-282040

(51) Int. Cl.
*B29B 9/00* (2006.01)
(52) U.S. Cl. .................... 264/7; 264/5; 264/12; 264/13; 71/64.03; 71/64.04; 71/64.05; 71/64.06; 425/7; 425/10; 425/222; 428/402; 428/403; 428/570
(58) Field of Classification Search .................... 425/222
See application file for complete search history.

(56) References Cited

U.S. PATENT DOCUMENTS

| 4,219,589 | A | * | 8/1980 | Niks et al. ..................... 427/213 |
| 5,213,820 | A | * | 5/1993 | Uhlemann et al. ............. 425/222 |
| 6,367,165 | B1 | | 4/2002 | Huettlin |

FOREIGN PATENT DOCUMENTS

| EP | 1 025 899 A1 | 9/2000 |
| EP | 1 698 393 A1 | 9/2006 |
| EP | 1 800 745 A1 | 6/2007 |
| JP | 54-16427 | 2/1979 |
| JP | 60-13735 | 4/1985 |
| JP | 60-97037 | 5/1985 |
| JP | 01-274832 | 11/1989 |
| JP | 4-63729 | 10/1992 |
| JP | 10-216499 | 8/1998 |
| JP | 11-137988 | 5/1999 |
| JP | 11-319535 | 11/1999 |

OTHER PUBLICATIONS

Machine translation of JP 10-216499 A.*
European Search Report dated Feb. 19, 2009.
Tenth Stamicarbon Urea Symposium 2004, Paper 17, Urea granulation experience at AZOT, Grodno, Belarus, by Ivan Korotkey et al, May 2004, Cover and pp. 1-15.
Office Action dated Sep. 15, 2009 for corresponding Japanese Application No. 2007-282040, with English translation.

* cited by examiner

*Primary Examiner* — Christina Johnson
*Assistant Examiner* — Benjamin Schiffman
(74) *Attorney, Agent, or Firm* — Flynn, Thiel, Boutell & Tanis, P.C.

(57) ABSTRACT

A granulator, having a granulation unit having a bottom floor with a perforated plate as its bottom part; an upper air-supplying pipe for supplying a fluidizing air to the bottom floor of the granulation unit; a lower air-supplying pipe; air-spouting pipes, each of which is branched from the lower air-supplying pipe, and has an opening in the bottom floor of the perforated plate, for jetting the air into the granulation unit; and spray nozzles for spraying a granulation raw material liquid, which each are provided in the center of an air outlet of the air-spouting pipe, or a granulator, having: the bottom floor; the air-supplying pipe; and spray nozzles for spraying a granulation raw material liquid each of which are provided in an opening in the bottom floor of the perforated plate, and use a high-pressure atomizing air as an auxiliary gas, wherein, in each granulator, the spray nozzles are provided in a triangular arrangement.

10 Claims, 7 Drawing Sheets

Flow direction of particles →

Flow direction of particles ⟹

METHOD OF GRANULATION WITH A FLUIDIZED BED GRANULATOR

FIELD OF THE INVENTION

The present invention relates to an improved energy-saving granulator and a granulation method using the same, for forming granules from a molten raw material, such as urea, sulfur, or from a slurry, for example, of urea/ammonium sulfate containing solid state ammonium sulfate in molten urea. In particular, the present invention relates to a granulator with a combination of a fluidized bed and a spouted bed, and to a method of granulation using the same.

BACKGROUND OF THE INVENTION

For granulators and methods of granulation for, for example, urea and urea/ammonium sulfate, in particular, many systems with a combination of a fluidized bed and a spouted bed (hereinafter, which may be referred to as "fluidized bed/spouted bed-type granulator") have been proposed (see, e.g. JP-B-4-63729 ("JP-B" means examined Japanese patent publication) (Claims (Claim 1), FIGS. 1 to 2), JP-A-10-216499 ("JP-A" means unexamined published Japanese patent application) (Claims (Claims 1 to 3), FIGS. 1 to 3), JP-A-11-137988 (Claims (Claims 1 to 19), FIGS. 1 to 18), JP-A-54-16427 (Claims (Claims 1 to 11), FIG. 1), JP-B-60-13735 (Claims (Claims 1 to 2), FIG. 1), and JP-A-60-97037 (Claims (Claims 1 to 3), FIGS. 1 to 3)), which are preferably practiced currently.

FIG. 1 shows schematically a typical example of such a fluidized bed/spouted bed-type granulator, and the technological characteristics thereof will be described with reference to this figure.

In the figure, for example, seed particles of urea are fed as nuclei to a granulator 1, through a line 41 from a line 40, which is a feed port of the line. In the granulator 1, an aqueous urea solution containing 90% by mass or more, preferably 95% by mass or more, of urea is sprayed as liquid droplets, having a diameter of 150 to 600 μm, to the nuclei at a prescribed spray angle chosen from 30 to 80 degrees, from spray nozzles 6, 7, and 8. Further, an aqueous urea solution (or molten urea) 17, having a concentration of 90% by mass or more, preferably 95% by mass or more, which is fed from a urea synthesis plant or the like (not shown), is set to a temperature of 125 to 145° C., fed from a line 31 to a mixing tank (concentrator) 21, and then fed through a line 36, a pump 22, and a line 37, to the spray nozzles 6, 7, and 8.

Seed particles of urea that are fed through the line 41 grow in its granule size while being subjected to spraying of the aqueous urea solution in the granulator 1. In this growing of the urea granules, by a spouting air flow supplied from the lower inlet of a line 24 through a lower air-supplying pipe 2 and then through air-supplying pipes 3, 4 and 5 branched from the pipe 2, a spouted bed 44 is formed over each of the openings of the air-supplying pipes, and the grown urea granules floating into the space 60 over the spouted beds fall, as the grown product (grown urea granules) 70, to the lower space 11 from the state 10 floating into the upper space. On the other hand, fluidizing air is supplied from the upper inlet of a line 23, jet through a plurality of openings in a bottom floor 9 to the upper space, the bottom floor 9 having the plurality of openings, thereby to form a fluidized bed 12 in which the grown granular urea 70 on the bottom floor 9 is in the fluidized state in the space 11 up to the level 12, and the growing granular urea is fluidized as they occupy the whole space 11 over the spray nozzles 6, 7 and 8.

The bottom floor is generally rectangular in shape, and urea (nuclei) fed to one end of the bottom floor moves continuously in such movement in the fluidized bed over the bottom floor toward the other end of the bottom floor. Thus, the urea (nuclei) moves as it is gradually granulated or enlarged, i.e. grown in granular size (diameter), and finally the granular urea after the completion of granulation is discharged out from an outlet of a line 25.

The proportion of those of a nominal product size among the granular urea discharged from the line 25 of the granulator 1 (hereinbelow, this proportion is referred to as a content of the nominal product size at the granulator outlet.), is generally 75 to 80%, and the granular urea is screened (sifted) through a screen (sieve) 13, to be separated into a standard (on-specification) product and a nonstandard (off-specification) product, with respect to the desired content of the nominal product size in a product. The standard product is passed through a line 26, to be stored as a product 14. On the other hand, to keep the numbers of nuclei in the granulator 1 constant, in view of the stable continuation of the production of the product, the product having a particle diameter greater than the specified particle diameter, and part of the standard product, are passed through a line 27 into a crusher 15, in which they are crushed; the product having a particle diameter smaller than the specified particle diameter is passed through a line 28 and is added to those in a line 29; and the resultant mixture is passed through a line 30 and the line 41 to the inlet of the granulator 1, to be recycled as nuclei for the granulation.

SUMMARY OF THE INVENTION

However, although the conventional fluidized bed/spouted bed-type granulators are considered to be technically established, the inventors of the present invention, after studying keenly, have found that there is still some more problems or technological difficulties to be overcome, including the followings:

(i) The minimum distance between spray nozzles configured (i.e. the minimum nozzle pitch) is determined, for prevention of interference between spray nozzles for spraying the raw material liquid. Thus, the total area of the bottom floor (perforated plate) should be raised, and the facility (area or volume) is getting bigger. Further, the air to be used is supplied, for example, for fluidizing of granules, drying of the sprayed raw material liquid, and cooling the product, but when the facility is made into a bigger size, it necessitates the supply of the air in an increased amount, in particular from the viewpoint of heat balance, resulting in a blower, a duct, and the like also made bigger;

(ii) The fluidized bed is formed over the perforated plate that is the bottom floor. The nuclei are fed to one end of the fluidized bed, and the granulated urea is discharged out from the other end as granules. Since the bottom floor (i.e. the fluidized bed) is rectangular in shape, the operational conditions are apt to depend on the state of the inlet of the fluidized bed. In particular, when the facility is made larger in size, the flow rate (throughput), temperature, and particle size distribution at the inlet of the fluidized bed (at the position where the nuclei are fed) are apt to be kept to the outlet, and it is difficult to make those uniform in the width direction (transverse direction), i.e. in the direction perpendicular to the flow direction; and (iii) When the linear velocity of the air for fluidization is insufficient, it may result in a deterioration in the stability of the fluidized bed and spouted bed, to cause aggregation of granules, consequently causing an irregularly shaped product. Further, when the fluidization linear velocity is low, it causes an increase in the particle density in the fluidized bed, to lead a problem of an increase in the pressure loss. On the other hand, a simple increase in the linear velocity for fluidization of the air only leads to an increase in the air amount and thus an increase in the energy consumption by blowers and others.

Accordingly, an object of the present invention is to overcome such problems associated with conventional fluidized bed/spouted bed-type granulators.

According to the present invention, there is provided the following granulators:

(1) A granulator, comprising:
a granulation unit having a bottom floor with a perforated plate as its bottom part;
an upper air-supplying pipe for supplying a fluidizing air to the bottom floor of the granulation unit;
a lower air-supplying pipe; air-supplying pipes, each of which is branched from the lower air-supplying pipe, and has an opening in the bottom floor of the perforated plate, for jetting the air into the granulation unit; and
spray nozzles for spaying a granulation raw material liquid in a molten, solution or slurry state, each being provided in the center of an air outlet of the air-supplying pipe,
wherein the spray nozzles are installed in the bottom floor in a triangular arrangement, and nuclei fed into the granulation unit are granulated with the granulation raw material liquid sprayed from the spray nozzles.

(2) A granulator, comprising:
a granulation unit having a bottom floor with a perforated plate as its bottom part;
an air-supplying pipe for supplying fluidizing air to the bottom floor of the granulation unit; and
spray nozzles for spraying a granulation raw material liquid in a molten, solution or slurry state, which are each provided in an opening in the bottom floor of the perforated plate, and use a high-pressure air as an auxiliary gas;
wherein the spray nozzles are installed in the bottom floor in triangular arrangement, and nuclei fed into the granulation unit are granulated with the granulation raw material liquid sprayed from the spray nozzles.

(3) The granulator according to (1) or (2), wherein the perforated plate has inclined openings so that the flow direction of the fluidizing air passing through said openings is inclined by an angle toward the vertical axis from a granule flow direction, when nuclei fed into the granulation unit are granulated with the granulation raw material liquid sprayed from the spray nozzles.

(4) The granulator according to any one of (1) to (3), wherein the linear velocity of fluidization of the fluidizing air is 2.0 to 3.5 m/s.

(5) The granulator according to any one of (1) to (4) wherein the pitch of the spray nozzles formed in the triangular arrangement is 0.2 to 0.5 m.

Further, according to the present invention, there is provided the following granulation method:

(6) A method of granulating granules, comprising:
spraying the granulation raw material liquid from the spray nozzles to nuclei fed into the granulation unit, by using the granulator according to any one of (1) to (5).

Other and further features and advantages of the invention will appear more fully from the following description, appropriately referring to the accompanying drawings.

DETAILED DESCRIPTION OF THE INVENTION

Hereinafter, preferable embodiments of the present invention will be described with reference to drawings.

Figure 1:
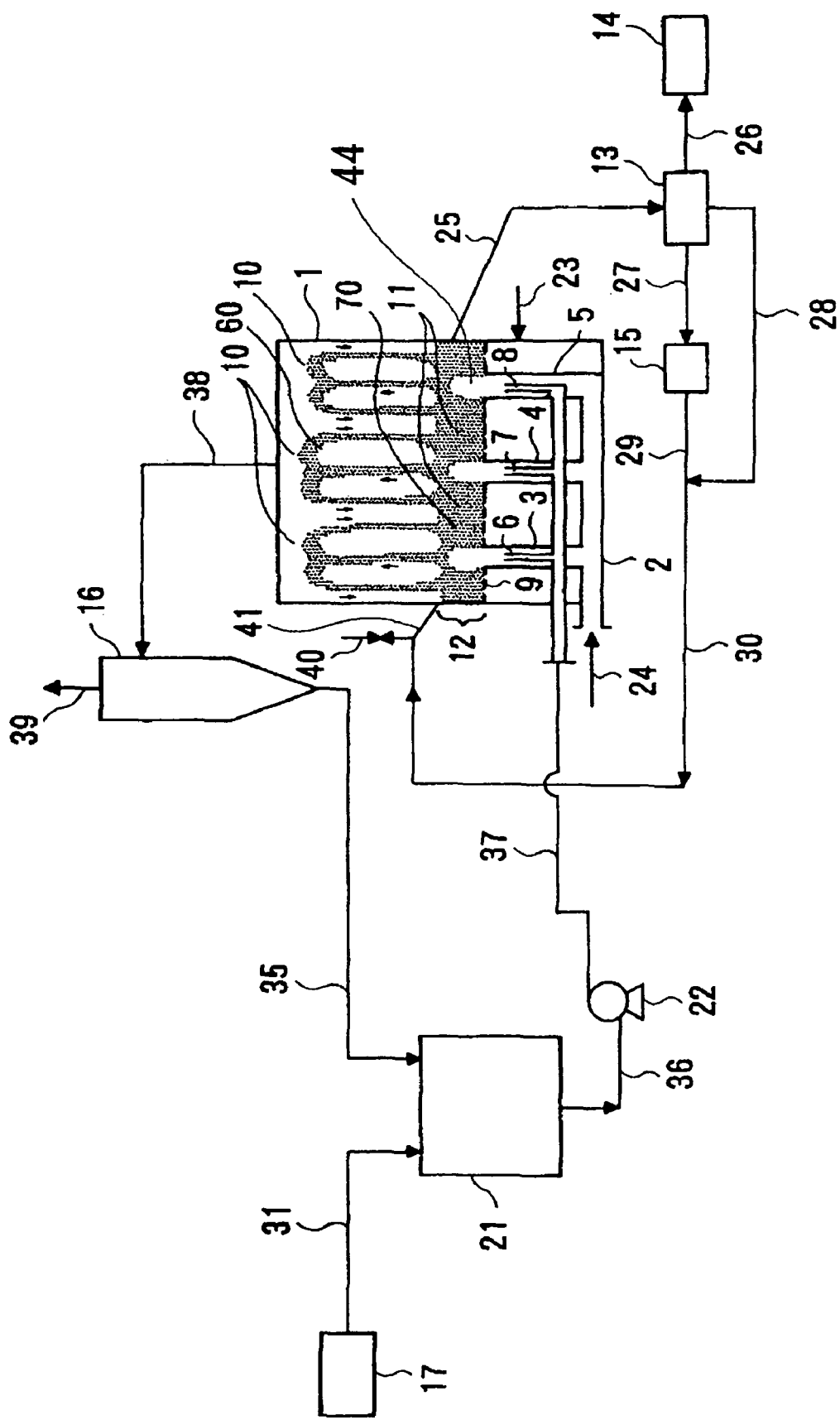
FIG. 1 is an illustrative view showing one embodiment indicating a process for producing urea or the like according to the conventional technique.
Figure 2:
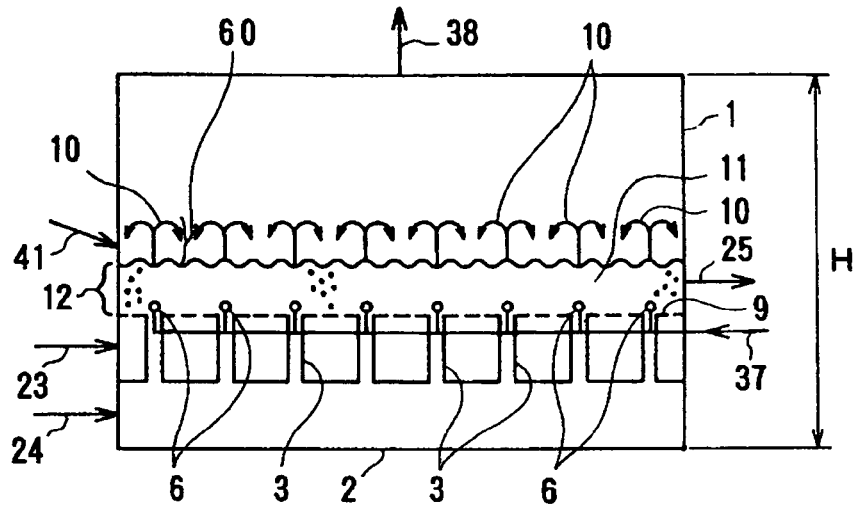
FIG. 2 is a schematic front view illustrating a spouting pipe system of a granulator with a combination of a spouted bed and a fluidized bed (fluidized bed/spouted bed-type granulator).
Figure 3:
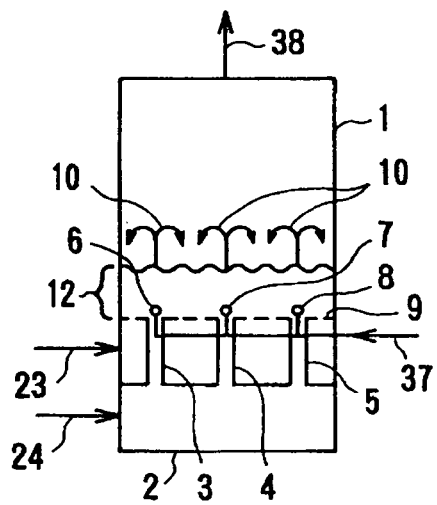
FIG. 3 is a schematic side view illustrating the spouting pipe system of a granulator with a combination of a spouted bed and a fluidized bed (fluidized bed/spouted bed-type granulator).
Figure 4:
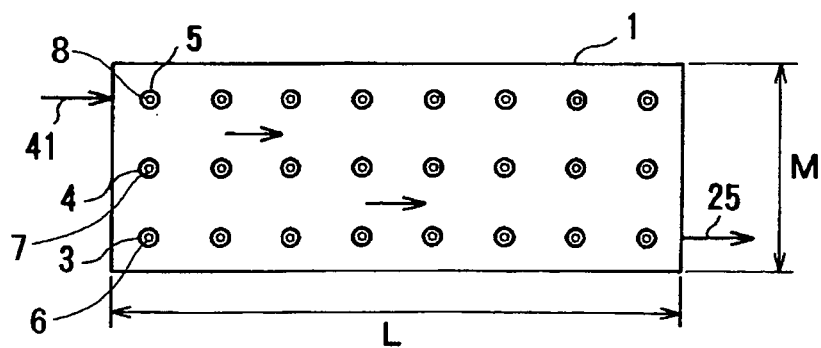
FIG. 4 is a schematic plan view illustrating the spouting pipe system of a granulator with a combination of a spouted bed and a fluidized bed (fluidized bed/spouted bed-type granulator) having spray nozzles in a rectangular arrangement.
Figure 5:
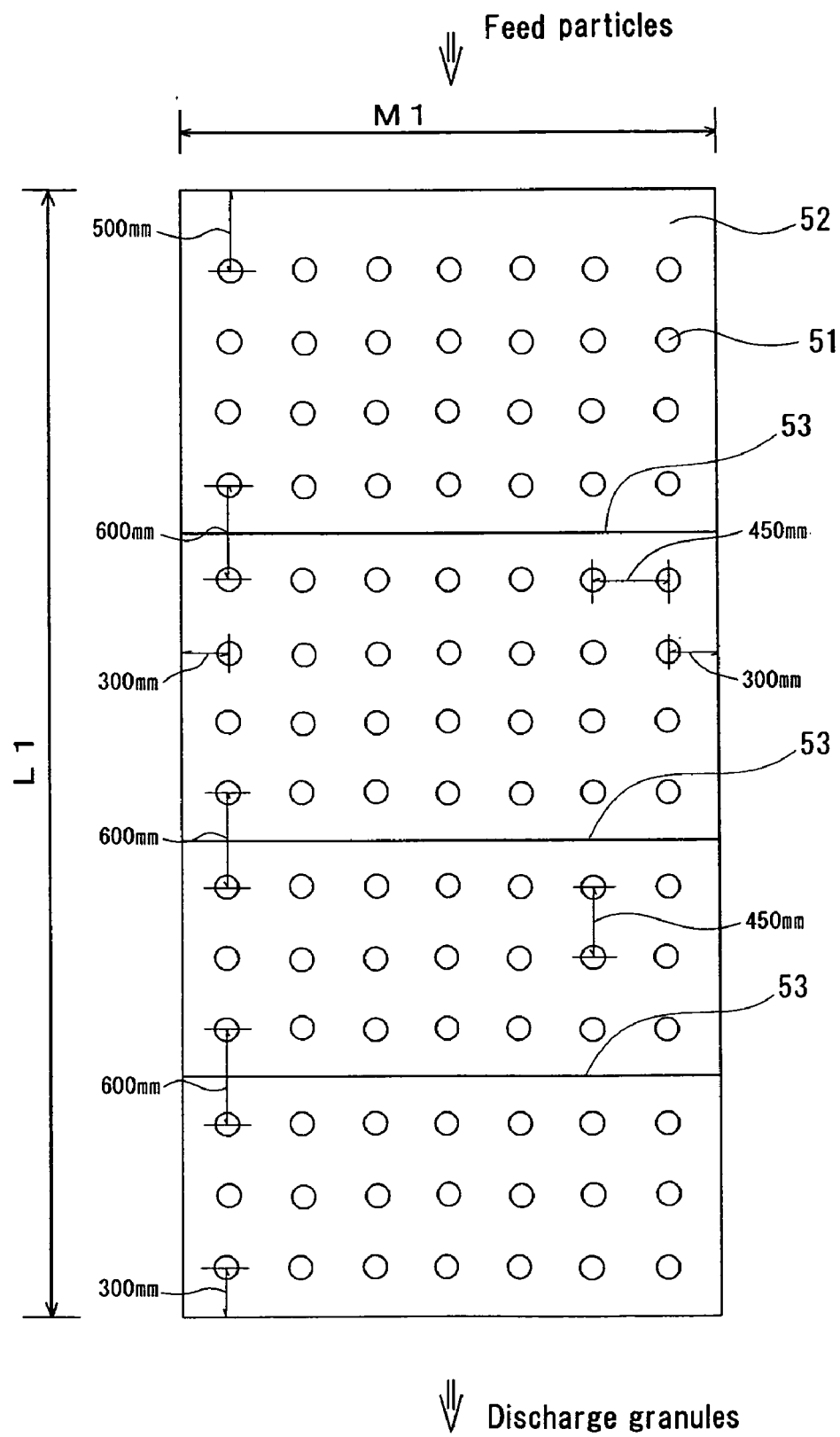
FIG. 5 is a schematic plan view illustrating the spouting pipe system of a granulator with a combination of a spouted bed and a fluidized bed (fluidized bed/spouted bed-type granulator) having spray nozzles in another rectangular arrangement.
Figure 6:
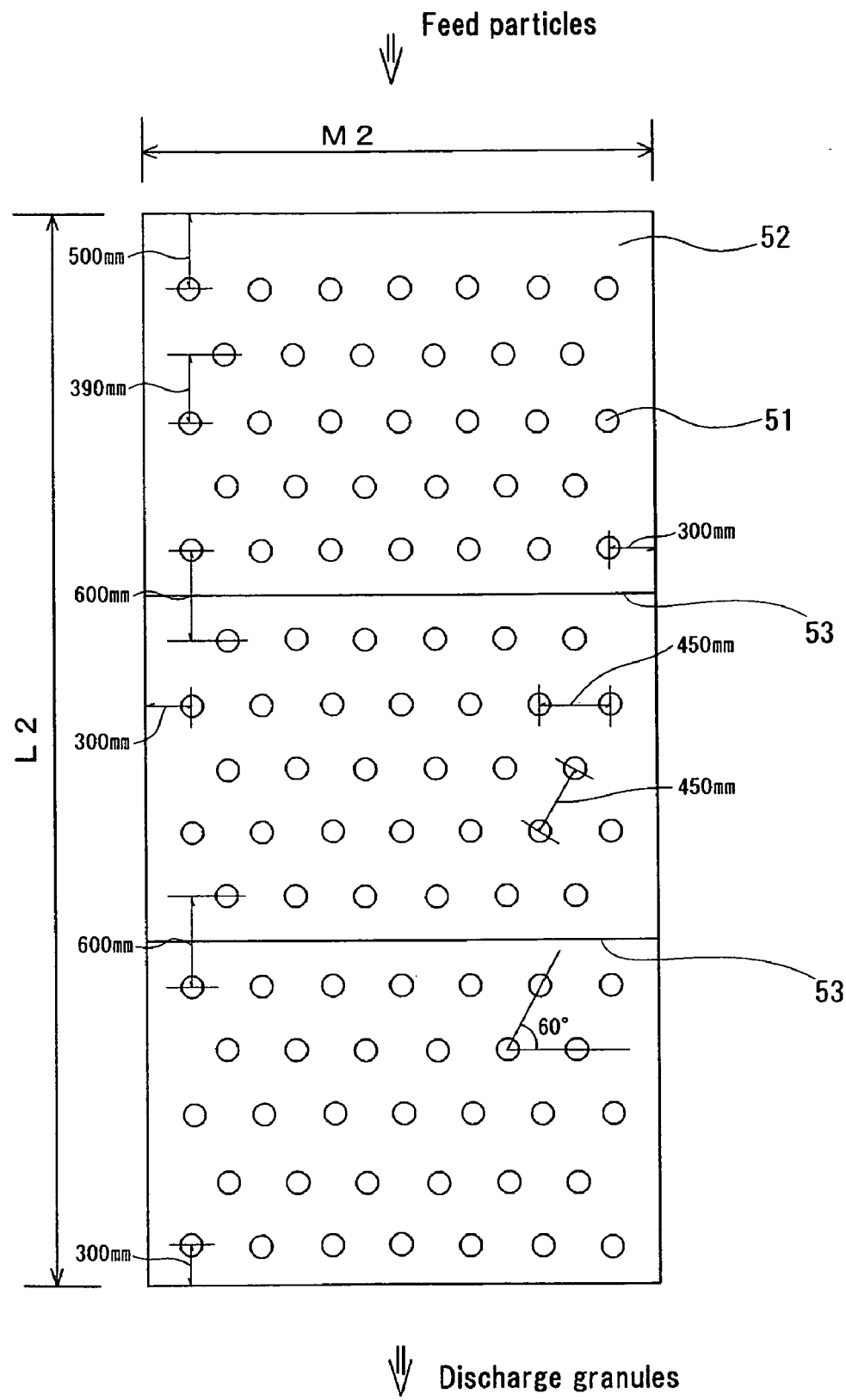
FIG. 6 is a schematic plan view illustrating the spouting pipe system of a granulator with a combination of a spouted bed and a fluidized bed (fluidized bed/spouted bed-type granulator) having spray nozzles in a triangular arrangement.

FIGS. 2 to 6 schematically show an embodiment of the granulator to which the present invention is applied to the granulator in a urea-producing process as shown in FIG. 1, in comparison with conventional embodiments; and FIG. 2 is the front view, FIG. 3 is the side view, and FIGS. 4 to 6 are the plan views. FIGS. 4 and 5 are the views illustrating the bottom floors of conventional granulators, and FIG. 6 is a view illustrating the bottom floor of the granulator of the present invention. The reference numerals in FIGS. 2 to 6 are the same as those used in FIG. 1, if the parts or units are the same.

As shown in FIGS. 1 to 3, the granulator (also referred to as a granulation apparatus) is a so-called spouting-pipe type granulator, and fundamentally has: a bottom floor 9 as a bottom part (base) of a perforated plate in a granulation unit; an upper air-supplying pipe for supplying the fluidizing air fed from a line 23 to the bottom floor 9 of the granulation unit; a lower air-supplying pipe connected to a line 24; air-supplying pipes 3, 4 and 5 branched from the lower air-supplying pipe and extending into the bottom floor of the perforated plate to form openings for jetting the air into the granulation unit; and spray nozzles 6, 7 and 8 provided in the center of the air outlets for spraying a granulation raw material liquid in the molten, solution or slurry state, and nuclei fed through a line 41 moves continuously in the direction from the granulator inlet to the granulator outlet in the fluidized bed while fluidized vertically and granulated.

FIGS. 4 to 6 are views illustrating the bottom floor (perforated plate) of the granulator 1, and, as shown in FIG. 4, spray nozzles in air spouting pipes are arranged (configured) in a conventional rectangular arrangement (also referred to as a checker board-like arrangement or a serial arrangement). In the figures, 3, 4, 5 . . . represent air-supplying pipes, 6, 7, 8 . . . represent spray nozzles for spraying of the granulation raw material, which are installed in the center of the air outlets of the air-spouting pipes. As shown in FIG. 4, eight rows each having three spray nozzles (total spray nozzle number: 24) per row are provided. The seeds of urea fed from the line 41 grow in particle size while sprayed with the aqueous urea solution in the granulator 1, and the granular urea obtained after granulation are discharged finally through the outlet port into a line 25.

FIG. 5 is a view of an example of the bottom floor (perforated plate) 52 when the number of rows of spray nozzles 51 and the number of spray nozzles 51 in each row are increased to scale up from those in FIG. 4, to conduct granulation in a greater amount, and the total fourteen rows each having seven spray nozzles 51 per row are provided (total spray nozzle number: 98). Further, a baffle plate 53 is provided almost in the crosswise direction in every 3 to 4 spray nozzle rows, for preventing direct flow of the particles from the granulator inlet to the outlet. The number of baffle plates is determined appropriately, taking into consideration the growth of the particles, but the baffle plate is provided generally in every 3 to 4 rows.

Such a rectangular spray nozzle arrangement leads to the problems as described in the above (i) to (iii), specifically that the production facility should be larger, which in turn makes it difficult to control the temperature and distribution in particle size uniformly in the crosswise direction to the flow and that an increase in linear velocity leads to an increase in air quantity and, consequently, an increase in energy consumption by blowers and others.

As shown in FIG. 6, the perforated plate 52 in the granulator of the present invention has spray nozzles 51 in air-spouting pipes placed in a triangular arrangement (also called as a zigzag arrangement), instead of the rectangular arrangement as shown in FIG. 5.

For example, when the distance between spray nozzles 51 is set to 450 mm, the perforated plate in the conventional example show in FIG. 5 has seven rows of fourteen columns (the total spray nozzle number: 98), width (M1) 3,300 mm, and length (L1) 7,100 mm. The spray nozzle distance (pitch between/among spray nozzles) is a distance between the center of a spray nozzle to the center of the adjacent another spray nozzle. The spray nozzle distance of 450 mm is a common value used, as the minimum spray nozzle distance, for conventional granulators. A distance smaller than that value may result in interference between spray nozzles.

On the other hand, in the triangular arrangement (the angle formed by two sides is 60°) as shown in FIG. 6, it is possible to form eight rows of seven spray nozzles per row and seven rows of six spray nozzles per row alternately in a plate of width (M2) 3,300 mm and length (L2) 6,680 mm (the total spray nozzle number: 98). In the present invention, it is possible in the triangular arrangement to make the row distance as small as 390 mm, while keeping the minimum spray nozzle distance of 450 mm. That is, in the spray nozzle arrangement of such a triangular arrangement, it is possible to provide the same number of spray nozzles in a smaller area and increase the number of rows to fifteen rows by one row. The increase in the row number is equivalent to an increase in the number of tanks in the so-called a continuous stirred tank model, which leads to an improvement in particle size distribution and in drying efficiency upon granulation. Thus, the above configuration can solve all of the problems above (i) to (iii) effectively and also improves the quality of the granulated product. As shown in FIG. 6, a baffle plate 53 is provided in every five spray nozzle rows. In a conventional machine in the size exemplified above, a baffle plate is necessary to be formed in every 3 to 4 spray nozzle rows, from the viewpoint of growth of particles, as shown in FIG. 5. In contrast, in the triangular arrangement according to the present invention, it is possible to exhibit the same favorable action as in the conventional one, even when the number of baffle plates is decreased, for example, under the influence by modification in row distance and linear velocity of fluidization. A decrease in the number of baffle plates enables a further reduction in size of the granulator. The number of baffle plates can be determined appropriately, taking the growth of the particles into consideration, and the baffle plate can be provided preferably in every 4 to 5 spray nozzle rows.

The pitch of the spray nozzles in the triangular arrangement may vary according to the total spray nozzle number, the spray nozzle number per row, the number of rows, and others, but the pitch of the spray nozzles mutually closest is preferably 0.2 to 0.5 m.

Figure 10:
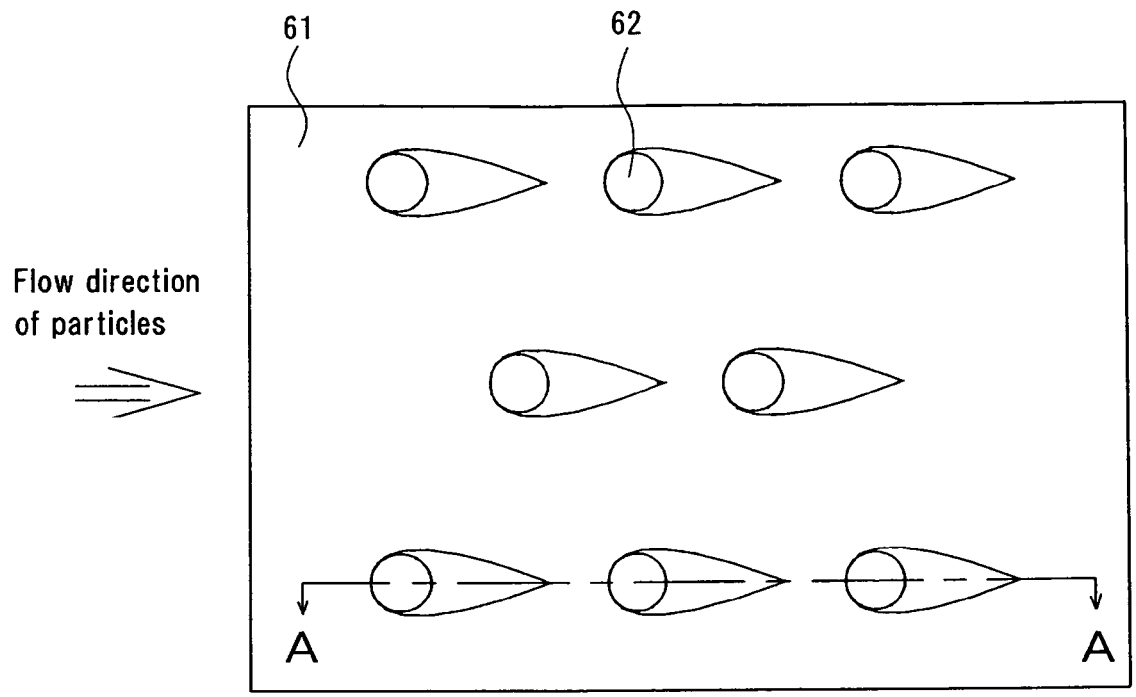
FIG. 10 is a partially enlarged plan view illustrating an example of a directional perforated plate.
Figure 11:
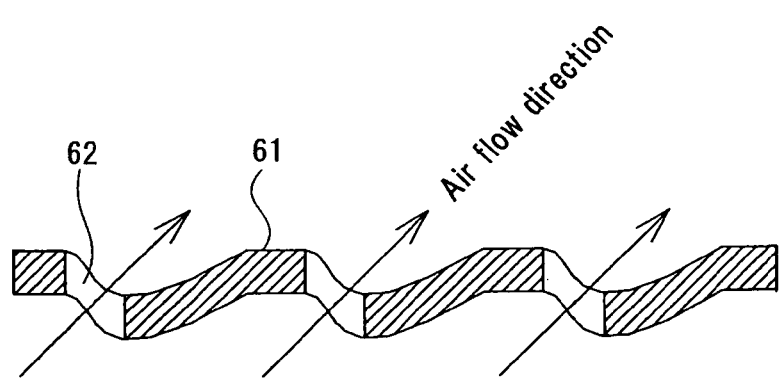
FIG. 11 is a cross-sectional view illustrating the example of a directional perforated plate.

The fluidizing air from the air-supplying pipe is fed out through the perforated plate of the bottom floor 9 of the granulator, thereby forming a fluidized bed over the bottom floor, and the openings are formed and provided in the perforated plate, in such a manner that the nuclei and growing urea or the like flow gradually and continuously in the direction from the granulator inlet to the granulator outlet. The flow direction of the air passing through the openings, which are formed in the perforated plate for the flow toward the granulator outlet direction, is preferably inclined in an inclined angle to the vertical axis from the particle flow direction. This embodiment of the perforated plate having openings with an inclined angle will be referred to as a "directional perforated plate". FIG. 10 is a partially enlarged plan view illustrating an example of the directional perforated plate. The cross-sectional view thereof along the line A-A is shown in FIG. 11. As shown in FIGS. 10 to 11, when the air jetted through openings 62 of a perforated plate 61 has an inclined angle, that is, the jetted-in air has a linear velocity in the direction inclined to the bottom floor, the velocity element in the vertical axis direction fluidizes the particles upward to form a fluidized bed, while the velocity element in parallel with the bottom floor exerts an action to transport and make the particles migrate along the bottom floor toward the outlet. Because of ease in manufacture, the perforation angle of the openings is generally set to an angle of 60 degrees or less inclined to the vertical axis.

Use of the triangularly arranged spray nozzles shown in FIG. 6 generally results in a problem that large aggregates do not pass effectively between the spray nozzles by the air spouted from spouting pipe or jetted from the perforation of the bottom plate, but by use of the directional perforated plate as bottom-floor perforated plate as described above, it is possible to direct the air flow jetted from each opening outlet and thus migrate the large aggregates faster at an increased linear velocity of fluidization toward the perforated plate outlet (fluidized bed outlet).

The granulation method of the present invention can be carried out in accordance with the production processes as shown in FIG. 1, using the granulator of the present invention.

The operation of the granulator 1 in the method of the present invention can be carried out, by referring to operating conditions in the conventionally known methods, as described in JP-B-4-63729, JP-A-10-216499, and JP-A-11-137988, except for conducting the points as specified in the present invention. That is, for example, the number of air feed pipes may be set in a density of 0.5 to 5 per m$^2$, or 6 to 10 per m$^2$, per the unit area of the bottom floor. The spraying angle of the spray nozzles 6, 7, and 8 is generally selected to be 30 to 80 degrees, and the rate of the air to be fed to each of the air spouting pipes 3, 4, and 5 is, for example, selected to be 250 to 10,000 Nm$^3$/h. In that case, the flow velocity of the air to be fed to the air spouting pipes 3, 4, and 5 is selected to be generally 5 to 50 m/s, and the temperature of the air is generally selected to be from ordinary temperature to 120° C. The height of the space 60 is selected to be generally 2 to 10 m from the bottom floor.

The fed amount of the raw material liquid per one spouted bed 44 is generally 0.2 to 1.2 t/h, the air quantity fed per one spouted bed 44 is generally 300 to 700 Nm$^3$/h, and the flow velocity of the spouting flow is generally 15 to 150 m/s.

On the other hand, with respect to the fluidized bed 12, the linear velocity of the air in the fluidization bed is preferably 2.0 to 3.5 m/s, and the height of the level 12 (fluidized bed) is, generally, set to 0.1 to 1.0 m in the static state and 0.3 to 1.0 m in the fluidizing state.

Figure 12:
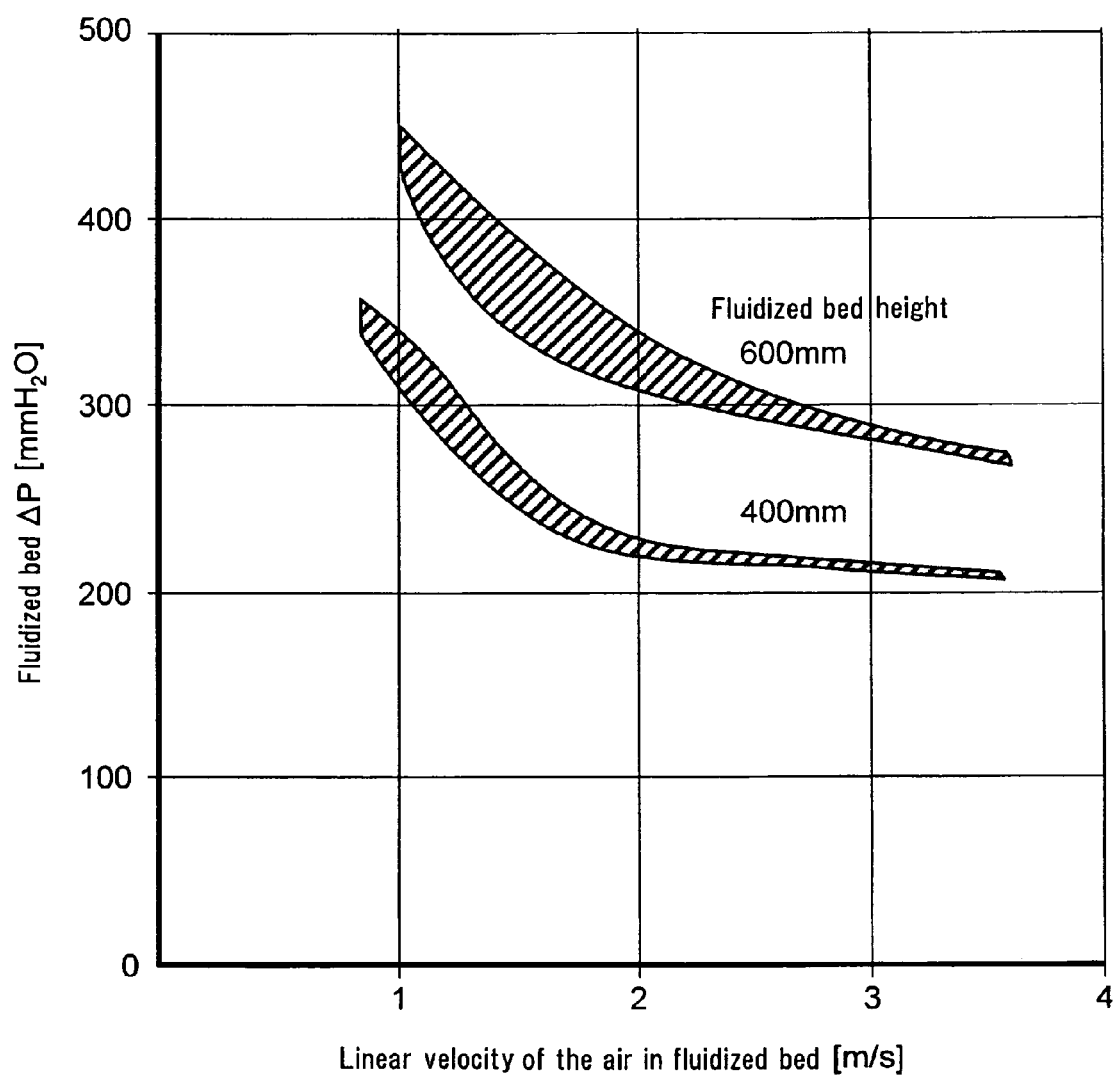
FIG. 12 is a graph showing the relationship between the fluidized-bed (fluid-bed) pressure loss and the linear velocity in fluidization of the air in a preferable embodiment of the present invention.

FIG. 12 is a graph showing the results actually measured by the relationship between the fluidized-bed (fluid-bed) pressure loss ($\Delta P$)[mmH$_2$O] and the linear velocity of the air in the fluidization bed [m/s] in a preferable embodiment of the present invention at a fluidized bed (fluid-bed) height of 600 mm and 400 mm.

In the cases of common equipment or piping, the pressure loss increases as the flow velocity is raised, but, as shown in FIG. 12, it is apparent that, in the fluidized bed, an increase in the linear velocity of the fluidizing air has a tendency to decrease the pressure loss. On the other hand, the higher the height of the fluidized bed, the larger the pressure loss. However, in the present invention, as shown in the figure, even when the fluidized bed height is higher, it is possible to decrease the pressure loss by raising the linear velocity. The inventors of the present invention found and paid attention to that point, to complete the present invention. That is, according to the present invention, by utilizing the combination of the minimization of the fluidized bed area in the triangular arrangement described above and the unique relationship between the air linear velocity and the pressure loss in the fluidized bed, it becomes possible, without increasing the air amount, to enhance the linear velocity, and to stabilize the fluidized bed with a smaller energy amount, even in a deeper fluidized bed [i.e. at a higher height of the fluidized bed], and to form granules of a favorable shape. Advantages of making the fluidized bed deeper include prevention of the droplets sprayed upward from the spray nozzles from passing through the fluidized bed without participating in granulation. When the fluidized bed is shallow, part of the droplets sprayed out of the spray nozzles pass through the fluidizing bed upwardly, without attaching to the fluidizing particles to enlarge them, followed by being solidified as the droplets are made into a dust, consequently leading to a lowered granulation efficiency.

Figure 7:
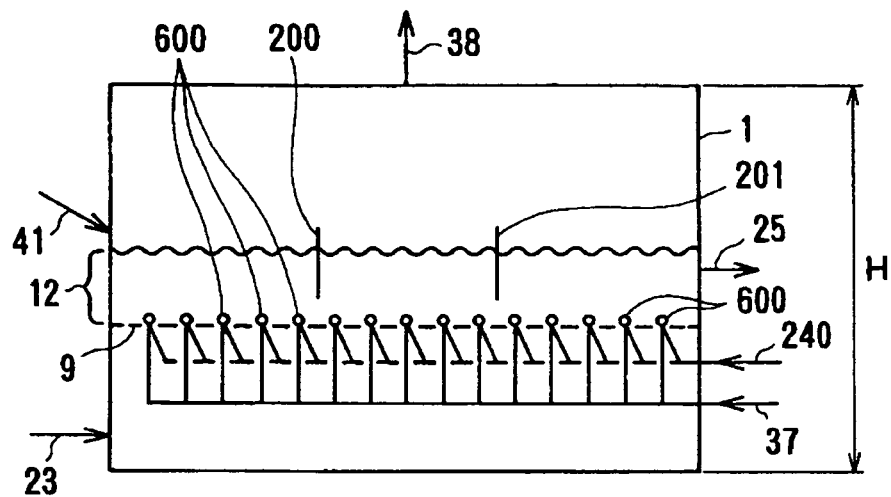
FIG. 7 is a schematic front view illustrating a fluidized bed-type granulator (fluidized bed/spouted bed-type granulator) in a high-pressure air spraying model.
Figure 8:
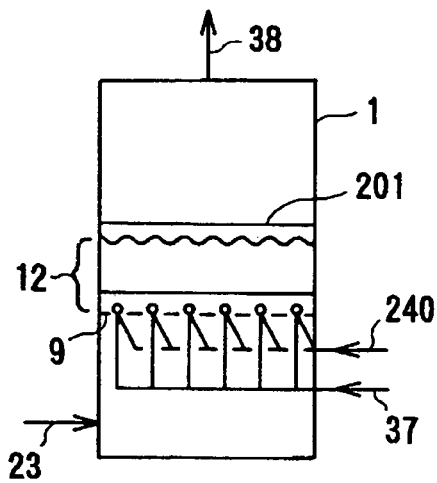
FIG. 8 is a schematic side view illustrating the fluidized bed-type granulator (fluidized bed/spouted bed-type granulator) in a high-pressure air spraying model.
Figure 9:
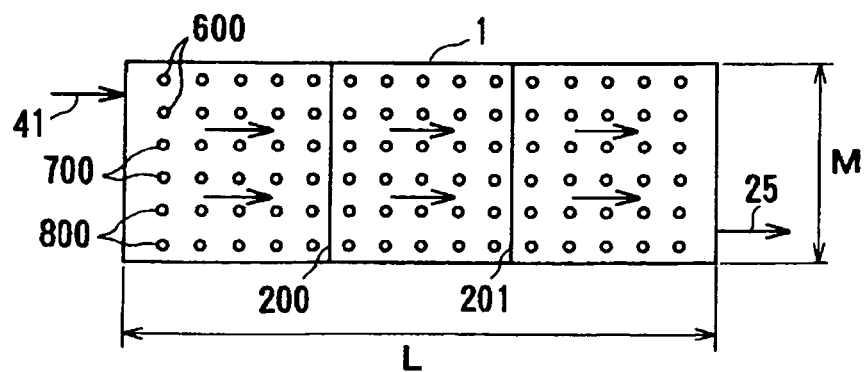
FIG. 9 is a schematic plan view illustrating the fluidized bed-type granulator (fluidized bed/spouted bed-type granulator) in a high-pressure air spraying model, having spray nozzles in a rectangular arrangement.

In the present invention, the granulator may be one based on the granulator as schematically shown in FIGS. 7 to 9. FIG. 7 is the front view, FIG. 8 is the side view, and FIG. 9 is the plan view. In contrast to the spouting-pipe granulator shown in FIGS. 1 to 6, the granulator shown in FIGS. 7 to 9 is a granulator called high-pressure air spraying model, in which use is made, as the spray nozzles, of "spray nozzles for spraying a granulation raw material liquid, which each are provided in an opening in the bottom floor of the perforated plate, and which each use a high-pressure air as an auxiliary gas". The granulator can be, however, the same as the fluidized bed/spouted bed-type granulator, except that the spraying method is different from the above one, and the basic operation thereof can be the same as that of the granulator shown in FIGS. 1 to 6.

As shown in the figures, droplets of the raw material liquid are sprayed from spray nozzles 600, 700 and 800, and the gas fed from a line 240 to the spray nozzles 600, 700 and 800 is a high-pressure air for atomization to be used as an auxiliary gas, and a spouted bed is formed over the spray nozzles by the high-pressure air in a similar manner as in the spouting pipe system. In the granulator in the embodiment shown in the figures, baffle plates 200 and 201 that block almost in the crosswise direction a flow of the nuclei fed from the line 41 through the granulator inlet to the outlet, are provided at the respective position higher than the level (fluidized bed) 12, although the baffle plates are basically not essential, for prevention of short pass of the particles and the discharge thereof of insufficient size. The particles grow during movement through the space between the baffle plates 200 and 201 and the bottom floor 9.

The spray nozzle arrangement in FIG. 9 is a conventionally known rectangular arrangement, in which fifteen rows of six spray nozzles per row are installed (total spray nozzle number: 90). In the present invention, this rectangular arrangement of spray nozzles as shown in FIG. 9 is changed to a triangular arrangement according to or similar to that shown in FIG. 6. For example, eight rows of six spray nozzles per row and eight rows of five spray nozzles per row (the total spray nozzle number 88, in the total 16 rows) may be arranged alternately, Similarly to the spouting pipe system, use of such a triangular spray nozzle arrangement can solve all the problems (i) to (iii) above effectively, and improve the quality of the granulation product.

In the production method according to the present invention, the operation of the granulator 1 can be carried out, by referring to operating conditions in the conventionally known methods as described, for example, in JP-A-54-16427, JP-B-60-13735, and JP-A-60-97037, in the similar manner as in the spouting pipe system described above, except for conducting the points as specified in the present invention.

For the operational condition for the granulator in the high-pressure air atomizing spray nozzle system, for example, as described in JP-B-60-13735, the raw-material-liquid spray nozzles 600, 700 and 800 using the high-pressure atomizing air as an auxiliary gas can have a spraying angle smaller than 20 degrees, the auxiliary fluid supplied from the line 240 to the vicinity of each of the spray nozzles 600, 700 and 800 may be set to have a flow volume of 130 Nm$^3$/h, the flow velocity of the auxiliary fluid may be set to 60 to 300 m/sec, the height of the level 12 (fluidized bed) may be set to 0.3 to 1.5 m, and the height of the space 60 may be et to 0.3 m to 1.5 m.

Further, similarly to the spouting pipe systems, the amount of the raw material liquid to be fed per one spouted bed 44 is generally 0.2 to 1.2 t/h, the air quantity to be fed per one spouted bed 44 is generally 300 to 700 Nm$^3$/h, and the flow velocity of the spouted flow is generally 15 to 150 m/s.

On the other hand, with respect to the fluidized bed 12, the linear velocity of fluidization is generally 2.0 to 3.5 m/s, and the height of the level 12 (fluidized bed) can be set generally to 0.1 m to 1.0 m in the static state and 0.3 m to 1.0 m in the fluidizing state.

Hereinafter, the fluidization conditions in the granulator are described briefly. As shown in FIGS. 2 and 4 or FIGS. 7 and 9, when the length of the bottom part of the granulator in the flow direction is designated to as L, the width of the particle flow is designated to as M (L>M), and the height is designated to as H, the internal volume V is the product of those three, and generally, the value L/M is set empirically to 2 to 10.

To express the mixing properties of apparatuses, there is a multi-stage continuous stirred tank model that approximates the mixing properties of the apparatus by a series of continuous stirred tank in a number of N whose volumes are the same each other. It is known that, according to the model, as the number N becomes larger, the resultant flow approaches a plug flow without any back mixing, and the distribution of the residence time of the individual granule becomes narrower. Further, even if the granulator is not partitioned into sections by partitioned plates but the granulator is made into a particular spindlier shape as a whole, it is known that such a shape has an effect similar to that by partitioning, thereby to give a narrower distribution of the residence time of the respective granule. A particular spindlier shape is more preferable for an increase in the number of N. In particular, in addition to the particular spindlier shape, when the perforated plate is provided with openings inclined so that a flow direction of the (fluidizing) air passing through said openings is inclined by an angle toward the vertical axis from a granule flow direction (which means the directional perforated plate), the particles move uniformly in the flow direction, i.e. toward the granulator outlet, to give a flow that is an approximate in the longitudinal flow with less back mixing. Thus, from the viewpoints in the above, by using a directional perforated plate, it is possible to make a granulator that can give a narrower residual time distribution and exhibit the advantageous effects of the present invention more effectively.

As described in detail herein, by applying the triangular arrangement of the spray nozzles for spraying the granulation raw material liquid, the present invention can exhibit the following advantageous effects:

(a) It is possible to take advantage of the total area of the bottom floor (perforated plate) more effectively. That is, since the bottom floor area needed for installation of the same number of spray nozzles in the triangular spray nozzle arrangement is smaller than that in the case of the conventional rectangular spray nozzle arrangement, the granulator can be made smaller in size. Thus, it is also possible to reduce the size of the blower, duct, and others as well;

(b) By providing the spray nozzles in the triangular arrangement, it is possible to make the distribution of temperature and distribution of particle size in the direction perpendicular to the flow in the fluidized bed more uniform, especially when the granulator is made bigger in its size;

(c) As described above, by providing the spray nozzles in the triangular arrangement, the granulator can be made smaller in its size, and the air quantity does not increase excessively even when the linear velocity in the fluidization of the air is enhanced sufficiently to assure stability of the fluidized bed and spouted bed, thus it is possible to assure a sufficient linear velocity of fluidization, without any drastic increase in the consumption energy by blowers and others. As a result, in the fluidized bed, the particle density is lowered, and the pressure loss is lowered and the probability of the particles being brought in contact with each other is also lowered, thus it is possible to prevent occurrence of irregular shaped particles or so-called popcorn-shaped granules, which may occur by aggregation of two or more particles; and (d) One reason of the conventional common use of rectangular arranged spray nozzles resides in that large aggregates, even when fed into the fluidized bed inlet, can be conveyed to pass through the space among spray nozzles rapidly without further growth of the particles. In contrast, if the triangular arranged spray nozzles according to the present invention are used, the possibility of collision of large aggregates to the spray nozzles is increased, and this may result in the tendency to make the particles difficult to pass through the space among the spray nozzles. However, by using the above-mentioned directional perforated plate of the bottom floor, to make the direction of the fluidizing air flow inclined, it is possible to raise the linear velocity of fluidization at the respective opening outlet (more precisely, a component of the linear velocity of fluidization in parallel with the bottom floor), making the movement of large aggregates more quick to pass through rapidly the space among the spray nozzles.

The present invention is described in more detail based on the following examples, but the invention is not intended to be limited thereto.

EXAMPLES

Reference Example 1

Urea granules were formed in a urea granulation facility of a daily output of 2,000 tons, according to the same flow as shown in FIG. 1. The urea seed particles are fed into the granulator 1 through a line 30. The air is supplied through a duct 24 and jetted upward in the spouted bed 44 at a flow velocity of 20 m/s. The upward air flow lifts the seed particles up, to form the spouted bed. Simultaneously, separate air is fed through a line 23 to the space under the bottom floor 9, the separate air passes through the bottom floor openings, and then rises upward in the fluidized bed at a flow velocity of 1.9 to 2.2 meter/sec. The air flow fluidizes the seed particles, to form the fluidized bed. A 95% aqueous urea solution discharged from a concentrator 21 is pressurized to 1.2 MPaG by a pump 22, and sprayed upward into the spouted bed 44 in the granulator 1 at a flow rate of 1.3 tons per hour per spray nozzle (represented by the referential numbers 6, 7 and 8 in the figure(s), but actually the number of spray nozzles is much larger in an actual urea granulation plant), allowing deposition of urea on the surface of the seed particles fluidizing the surroundings, vaporization of water, and solidification of the urea. The solidification heat of urea is removed efficiently by the vaporization of water occurring simultaneously. The seed particles grow in size gradually, during movement from the inlet to outlet in the granulator (from left to right in FIG. 1), by solidification of the urea solution sprayed. The urea particles grown in the granulator are discharged through a line 25, into a screen 13, where they are classified into granules of the product size, smaller size, and larger size. Urea granules of the product size are discharged out as a product. The smaller sized granules are fed back into the granulator as seed particles. The larger sized granules are crushed in a crusher 15, and the resultant crushed urea granules are then fed back into the granulator 1, as seed particles, together with the smaller-sized granules. The air containing urea fine-particles (dust) discharged from the top of the granulator 1 (from a line 38) is brought into contact with an aqueous urea solution and washed in a dust-collecting unit 16, and then released into the atmosphere through a line 39. The urea dust collected is dissolved into an aqueous urea solution, followed by feeding into a concentrator 21 through a line 35. The product 14 produced and granulated by this method was analyzed to determine the irregular shaped urea content, which was 55 wt %. The results are shown in Table 1. Table 1 also shows the spouted-air flow velocity, the fluidizing air-flow velocity, and the fluidized bed height as well.

Reference Example 2

Urea particles were granulated in a urea granulator with a daily output of 1,700 tons in the same flow as that in Reference Example 1, except that the air flow velocity in the fluidized bed was changed to 2.4 to 2.5 meters per second. The indefinite-shaped urea content in the product 14 was determined to be 36 mass %, as shown in Table 1, which was remarkably lower than that in Reference Example 1.

TABLE 1

|  |  | Reference Example 1 | Reference Example 2 |
|---|---|---|---|
| Facility capacity | t/d | 2,000 | 1,700 |
| Spouting-pipe nozzle arrangement |  | Rectangular | Rectangular |
| Spouted-air flow velocity | m/s | 20 | 20 |
| Fluidizing-air flow velocity | m/s | 1.9 to 2.2 | 2.4 to 2.5 |
| Fluidized bed height | m | 0.3 | 0.3 |
| Content of Indefinite shaped product | % | 55 | 36 |

Comparative Example 1

Ninety-eight spray nozzles in a granulator with a daily output of 2,000 tons were configured in a rectangular arrangement of fourteen rows of seven spouting-pipe nozzles per row. In this case, the dimension of the bottom floor was 3.3 m×7.1 m. Table 2 shows the linear velocity in the fluidization of the air, the fluidizing air temperature, the fluidizing air flow rate, the fluidized bed height, the fluidized bed pressure loss, the granulator bottom floor area, and the fluidized bed volume.

Example 1

The spouting-pipe nozzle configuration was changed to the triangular arrangement, as a result the dimension of the bottom floor was 3.3 m×6.68 m and the number of spray nozzle rows was 15. The linear velocity in the fluidization of the air and others are summarized in Table 2, similar to Comparative Example 1. As shown in Table 2, the reduction in size and increase in the number of rows were achieved at the same time in Example 1.

Example 2

The spouting-pipe nozzles in a granulator with daily output 3,300 tons were configured in a triangular arrangement and the distance between the nozzles was made shorter, to enhance the efficiency per unit area. The linear velocity in the fluidization of the air and others are summarized in Table 2, similar to Comparative Example 1. As shown in Table 2, in Example 2, the bottom floor area per ton daily output was able to be reduced by approximately 21%, compared to that in Comparative Example 1, and the linear velocity in the fluidization of the air was able to be increased from 2.0 meters per second to 2.5 meters per second.

TABLE 2

|  |  | Comparative Example 1 | Example 1 | Example 2 |
|---|---|---|---|---|
| Facility capacity | t/d | 2,000 | 2,000 | 3,300 |
| Spouting-pipe nozzle arrangement |  | Rectangular | Triangular | Triangular |
| Number of spouting pipes |  | 98 | 98 | 165 |
| Number of spouting-pipe rows |  | 14 | 15 | 22 |
| Spouted-air flow velocity (inlet standard) | m/s | 2.0 | 2.0 | 2.5 |
| Fluidizing-air temperature (inlet) |  | 44 | 44 | 44 |
| Fluidizing-air flow rate | $Nm^3/h$ | 145,000 | 143,000 | 220,000 |
| Fluidized bed height | m | 0.30 | 0.30 | 0.40 |
| Pressure loss in fluidized bed | $mmH_2O$ | 160 | 160 | 210 |
| Dimension of granulator bottom floor (W × L) | m | 3.3 × 7.1 | 3.3 × 6.68 | 3.5 × 8.6 |
| Area of granulator bottom floor | $m^2$ | 23.4 | 22.1 | 30.2 |
| Area of granulator bottom floor/facility capacity | $m^2/t/d$ | 0.0116 | 0.0111 | 0.00915 |
| Fluidized bed volume | l/t/d | 3.47 | 3.47 | 3.66 |

INDUSTRIAL APPLICABILITY

By configuring the spray nozzles for spraying a granulation raw material liquid in a triangular arrangement, the present invention can exhibit, for example, the following advantageous effects:

(a) Since the bottom floor area needed for installation of the same number of spray nozzles in the triangular spray nozzle arrangement is smaller than that in the case of the conventional rectangular spray nozzle arrangement, the granulator can be made smaller in size. Thus, it is also possible to reduce the size of the blower, duct, and others as well;

(b) It is possible to make the distribution of temperature and distribution of particle size in the direction perpendicular to the flow in the fluidized bed more uniform, especially when the granulator is made bigger in its size; and further (c) Since the air quantity does not increase excessively even when the linear velocity in fluidization of the air is enhanced sufficiently to assure stability of the fluidized bed and spouted bed, it does not cause any drastic increase in the consumption energy by blowers and others. Thus, the present invention has an extremely broad industrial applicability.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2007-282040 filed in Japan on Oct. 30, 2007, which is entirely herein incorporated by reference.

What we claim is:

1. A method of granulating granules, comprising the steps of:
   providing a rectangular granulation unit comprising a bottom floor with a perforated plate as its bottom part, an upper air-supplying pipe for supplying a fluidizing air to the bottom floor of the granulation unit, a lower air-supplying pipe, air-supplying pipes branched from the lower air-supplying pipe and having openings provided in the bottom floor of the perforated plate for jetting air into the granulation unit, and spray nozzles for spraying a granulation raw material liquid in a molten solution or slurry state, with said spray nozzles being provided in the bottom floor in triangular arrangement and being provided in the center of air outlets of the air-supplying pipes;
   feeding nuclei into the granulation unit through a nuclei feed inlet; and
   spraying the nuclei in the granulation unit with the granulation raw material liquid from the spray nozzles to form granules,
   wherein the perforated plate has openings inclined so that a flow direction of the fluidizing air passing through said openings is inclined by an angle towards the vertical axis from a granule flow direction towards a side of the granulation unit opposite to the nuclei feed inlet, when nuclei fed into the granulation unit are granulated with the granulation raw material liquid sprayed from the spray nozzles.

2. The method according to claim 1, wherein a linear velocity of fluidization of the fluidizing air is 2.0 to 3.5 m/s.

3. The method according to claim 2, wherein a pitch of the spray nozzles formed in the triangular arrangement is 0.2 to 0.5 m.

4. The method according to claim 1, wherein a pitch of the spray nozzles formed in the triangular arrangement is 0.2 to 0.5 m.

5. The method according to claim 1, additionally comprising the step of discharging the granules through a granule discharge outlet provided at a side opposite to the nuclei feed inlet.

6. A method of granulating granules, comprising the steps of:
   providing a rectangular granulation unit comprising a bottom floor with a perforated plate as its bottom part, an air-supplying pipe for supplying fluidizing air to the bottom floor of the granulation unit, and spray nozzles for spaying a granulation raw material liquid in a molten solution or slurry state which use high-pressure air and are provided in triangular arrangement at the bottom floor of the granulation unit;
   feeding nuclei into the granulation unit through a nuclei feed inlet; and
   spraying the nuclei in the granulation unit with the granulation raw material liquid from the spray nozzles to form granules,
   wherein the perforated plate has openings inclined so that a flow direction of the fluidizing air passing through said openings is inclined by an angle towards the vertical axis from a granule flow direction towards a side of the granulation unit opposite to the nuclei feed inlet, when nuclei fed into the granulation unit are granulated with the granulation raw material liquid sprayed from the spray nozzles.

7. The method according to claim 6, wherein a linear velocity of fluidization of the fluidizing air is 2.0 to 3.5 m/s.

8. The method according to claim 7, wherein a pitch of the spray nozzles formed in the triangular arrangement is 0.2 to 0.5 m.

9. The method according to claim 6, wherein a pitch of the spray nozzles formed in the triangular arrangement is 0.2 to 0.5 m.

10. The method according to claim 6, additionally comprising the step of discharging the granules through a granule discharge outlet provided at a side opposite to the nuclei feed inlet.

* * * * *